US006668630B1

(12) United States Patent
Kuglin et al.

(10) Patent No.: US 6,668,630 B1
(45) Date of Patent: Dec. 30, 2003

(54) DEVICE FOR MONITORING THE COMBUSTION PROCESS IN INTERNAL COMBUSTION ENGINES

(75) Inventors: Eckart Kuglin, Leonberg (DE); Albrecht Geissinger, Muehlacker (DE); Gert Lindemann, Lichtenstein (DE); Johannes Locher, Seoul (KR); Wolfgang Dressler, Vaihingen/Enz (DE); Friederike Lindner, Gerlingen (DE); Volker Rothacker, Bietigheim-Bissingen (DE); Christoph Kern, Aspach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/807,103

(22) PCT Filed: Sep. 11, 1999

(86) PCT No.: PCT/DE99/02895

§ 371 (c)(1),
(2), (4) Date: Aug. 2, 2001

(87) PCT Pub. No.: WO00/22288

PCT Pub. Date: Apr. 20, 2000

(30) Foreign Application Priority Data

Oct. 8, 1998 (DE) ........................................ 198 46 356

(51) Int. Cl.[7] ................................................ G01M 15/00

(52) U.S. Cl. ...................................... 73/117.3; 73/117.3

(58) Field of Search ................................ 73/116, 117.3, 73/118, 35.07; 123/400–429

(56) References Cited

U.S. PATENT DOCUMENTS

| | | | | | |
|---|---|---|---|---|---|
| 3,703,825 | A | * | 11/1972 | Merlo | 73/116 |
| 4,444,169 | A | | 4/1984 | Kirisawa et al. | |
| 4,665,740 | A | * | 5/1987 | Matsumoto et al. | 73/116 |
| 4,774,834 | A | | 10/1988 | Russell et al. | |
| 4,779,455 | A | | 10/1988 | Kuroiwa et al. | |
| 4,806,289 | A | | 2/1989 | Laursen et al. | |
| 4,919,099 | A | * | 4/1990 | Extance et al. | 123/425 |
| 5,922,948 | A | * | 7/1999 | Lesko et al. | 73/117.3 |

FOREIGN PATENT DOCUMENTS

| | | |
|---|---|---|
| DE | 31 10 996 | 9/1982 |
| DE | 40 42 025 | 7/1992 |
| EP | 0 280 188 | 8/1988 |

* cited by examiner

*Primary Examiner*—Kamand Cuneo
*Assistant Examiner*—Monica D. Harrison
(74) *Attorney, Agent, or Firm*—Kenyon & Kenyon

(57) ABSTRACT

A device is proposed for monitoring the combustion process in internal combustion engines, a direct monitoring and a monitoring of individual combustion processes, in particular individual combustion chambers, being possible. This is achieved using a waveguide, which is integrated in a component, which protrudes into the combustion chamber.

10 Claims, 1 Drawing Sheet

DEVICE FOR MONITORING THE COMBUSTION PROCESS IN INTERNAL COMBUSTION ENGINES

BACKGROUND INFORMATION

For internal combustion engines, particularly diesel engines, combustion dynamics have always played a major role in the goal of achieving good engine characteristics. In this context, it is advantageous for the optimal ignition firing point to be controlled as exactly as possible, as well as for the fuel quantity injected by the injection system to be dosed as exactly as possible. In newer engine developments, the possibilities for acting in a controlling manner on the combustion dynamics have been further improved.

To date, the combustion process has been monitored by checking the exhaust gas emission specifications. The lambda probes that have come into use above all in conjunction with regulated catalytic converters determine the composition of the exhaust gas from which conclusions are made regarding the combustion process. Based on this information, the engine management can be acted on in a regulating manner.

This form of combustion monitoring has the disadvantage that it is not carried out directly in the combustion chamber, thereby resulting in a certain delay time between the respectively occurring combustion process, the acquisition of the necessary information from the exhaust gas analysis, and the subsequent, regulating action on the engine management. Furthermore, checking the exhaust gas has the disadvantage that, in the exhaust gas analysis, the mean is taken over the combustion processes taking place in different combustion chambers, i.e., in different cylinders in the case of conventional internal combustion engines. A differentiated observation of the individual combustion processes, particularly also of individual cylinders, is not possible using the exhaust gas analysis according to the related art.

SUMMARY OF THE INVENTION

Therefore, it is an object of the present invention to propose a device for monitoring the combustion, where the above-mentioned delay time is reduced, and it is possible to monitor individual combustion processes, particularly differentiated according to individual combustion chambers.

Accordingly, the monitoring device according to the present invention is distinguished in that a waveguide for electromagnetic radiation is integrated in a component that protrudes into a combustion chamber of an internal combustion engine. This measure makes it possible to observe, outside of the combustion chamber, the electromagnetic radiation produced during combustion, and to obtain corresponding information for the dynamics of the combustion process.

Preferably, in this context, the radiation occurring in the visible or infrared range is analyzed, and the waveguide is accordingly adjusted to this range of the wavelength. Since very high temperatures are reached during combustion, the majority of the radiation spectrum emitted in the combustion chamber by the hot, compressed gas is within the indicated wavelength range.

Thus, the highest intensity levels of the emitted radiation, which are to be determined via a sensor at the output of the waveguide, are present in this wavelength range. The intensity of the emitted radiation can be recorded in a manner resolved with respect to time, from which significant conclusions regarding the combustion dynamics can already be reached. In particular, the ignition firing point as well as the duration of the fuel injection, for example, can be discerned from this. Based on such an intensity distribution, a conclusion can also be reached regarding the quantity of injected fuel.

In a further refinement of the present invention, a sensor suitable for analyzing frequency is arranged at the output of the waveguide. By analyzing the frequency of the emission spectrum in the interior of the combustion chamber, an exact conclusion regarding the temperatures prevailing there can be drawn. Conventional pyrometers also function according to this principle. Thus, using such a sensor device in conjunction with the waveguide according to the present invention, the temperature progression in the interior of the combustion chamber can be determined in a manner resolved with respect to time.

Preferably, the waveguide is integrated in a component that is already present in known engines and protrudes into the combustion chamber. For example, spark plugs in Otto engines or glow plugs in diesel engines can be used for this purpose.

Preferably, the material of the waveguide is selected so that essentially the same coefficient of thermal expansion is present as for the adjoining material. Since very high temperatures can prevail at least temporarily in the interior of the internal combustion engine, e.g. between 900° C. and 1000° C. for diesel engines, the indicated material selection ensures that stresses occurring at the material boundaries are minimal, thereby ensuring a lasting, effective bond between the waveguide and the neighboring material. An effective material bond is indispensable for ensuring that the component, e.g. the glow plug, is sealed.

In a further refinement of the present invention, the component is made of a ceramic material. Newer developments are already beginning to select a ceramic material for the construction, above all for glow plugs, since, in addition to ensuring a higher temperature resistance, using a ceramic material makes it possible to produce glow plugs having a faster reaction time and a longer service life.

Using ceramic materials is also advantageous when producing a waveguide according to the present invention, since many glasses that are suitable as waveguides have a similar coefficient of thermal expansion, thereby simplifying the integration of the waveguide in the corresponding component.

In a specific embodiment of the present invention, a conventional fiber optic guide is embedded in the material of a glow plug. Such fiber-optic cables or bar-shaped fiber optic guides are commercially available and, thus, easily accessible. Light-conductive fibers or fiber bundles are also a possibility. In every case, the wave-guiding function is ensured by the material arrangement having a fluctuating refractive index, thereby resulting in the light being guided in the longitudinal direction of the waveguide.

In this context, in the case of a glow plug, the waveguide can be embedded either in a conducting layer, or also in an insulating layer. This is preferably decided in an application-specific manner, according to the materials present in a respective glow plug as well as the material of the fiber optic guide, so that the embedding can be performed as simply as possible due to these material characteristics.

As already indicated several times, very high temperatures prevail in the interior of the combustion chamber. At least the end of the waveguide projecting into the interior of the combustion chamber is to withstand these temperatures.

In some instances, this can cause problems among conventional waveguides. In this case, for example, the front end, i.e., the end of the waveguide protruding into the combustion chamber, can be arranged in such a manner that it does not end in the region of the tip of the glow plug, but rather ends further back. The temperature stress of the glow plug reduces from the inwardly projecting tip to the back end.

Furthermore, in an advantageous specific embodiment, the waveguide can be formed by a peripheral-sided layering of different layers that are transparent in the visible and infrared range and have different refractive indices. For this design, highly temperature-resistant glasses are already available that have optical characteristics and match will with respect to their thermal expansion behavior to the ceramics used for glow plugs.

Advantageously, the information obtained by the monitoring device according to the present invention is used for actively regulating an internal combustion engine. For this purpose, a regulating unit is provided for regulating different engine management parameters. Thus, for example, the ignition firing point can be carried out on the basis of the sensor signal recorded at the output of the waveguide. Moreover the injection quantity and/or also the time characteristic of the fuel injection, for example, are controlled on the basis of this sensor signal.

Finally, the air-intake system can also be controlled by the regulating unit on the basis of such a sensor signal.

All known or future control parameters for influencing engine characteristics can ultimately be optimally regulated with the aid of the monitoring device according to the present invention.

Furthermore, using the monitoring device, the performance of engine components, e.g. of the fuel injectors, can also be monitored. The flawless performance of the fuel injectors is of utmost importance for the service life of the engine. A fuel injection that either lasts too long or occurs at the wrong instant can cause the engine to overheat, thereby causing engine failure. As a result of the monitoring device according to the present invention, a malfunction of a fuel injector can be detected in time, and the fuel injector can be and replaced or repaired.

In principle, all monitoring processes available on the basis of the determined information are conceivable using the monitoring device according to the present invention. For example, monitoring the engine compression on the basis of the determined inside temperature in the combustion chamber would also be imaginable.

DETAILED DESCRIPTION

Figure 1:
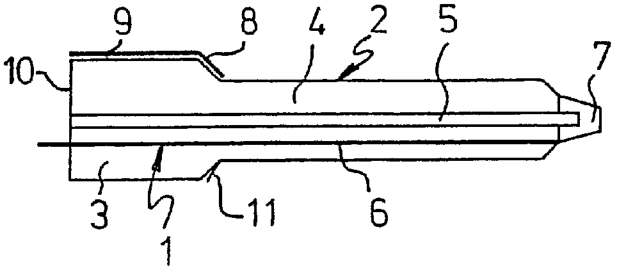
FIG. 1 shows a schematic longitudinal cross section of a glow plug having a monitoring unit according to the present invention.
Figure 2:
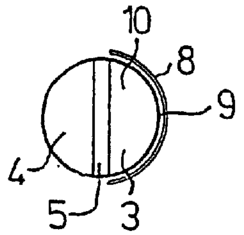
FIG. 2 shows a back view of a glow plug according to FIG. 1.

Monitoring device 1 in accordance with FIG. 1 is integrated in a glow plug 2 made of 2 conductive layers 3, 4, as well as of an intermediate insulating layer 5. A fiber optic guide 6 is embedded in the conductive layer. It ends in the region of glow plug tip 7.

A glow plug shell 8 is indicated in the back region of glow plug 2 and is insulated by an insulating layer 9 with respect to conductive layer 4.

Conductive layers 3, 4 are contacted by two contact surfaces 10, 11, conductive layer 3 being connected by contact surface 11 to the engine ground in the present case.

Figure 3:
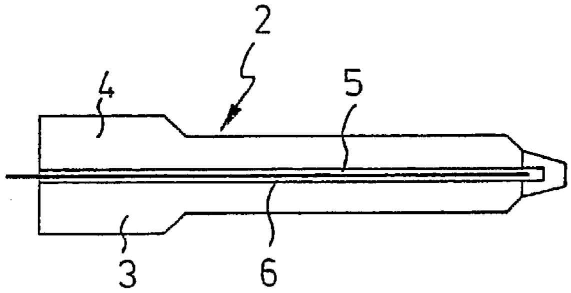
FIG. 3 shows a further specific embodiment of a glow plug according to the present invention.

The design according to FIG. 3 essentially corresponds to the previously described exemplary embodiment, fiber optic guide 6 now being embedded in the interior of insulating layer 5.

Figure 4:
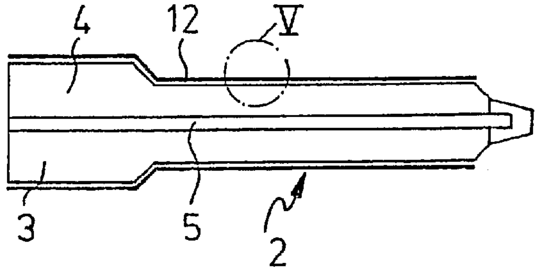
FIG. 4 shows a third specific embodiment of a glow plug according to the present invention.
Figure 5:
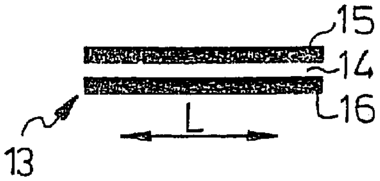
FIG. 5 shows an enlargement of the section designated as V in FIG. 4.

In contrast, in the specific embodiment according to FIG. 4, waveguide 12 is deposited on the peripheral side by a layer construction 13. This layer construction 13 is exemplarily shown in an enlarged representation in FIG. 5. The layer construction includes three glass layers 14, 15, 16. In each case, the glass is selected so that total reflection occurs at the boundary surface between outer glass layers 15, 16 to inner glass layer 14. In this manner, with respect to the representation according to FIG. 5, light in the interior of glass layer 14 is directed to the left to the back end of the glow plug (see arrow). In this exemplary embodiment, waveguide 12 is arranged to an extent as an outer tube around glow plug 2.

List of Reference Numerals

1 monitoring device
2 glow plug
3 conductive layer
4 conductive layer
5 insulating layer
6 fiber optic guide
7 glow plug tip
8 glow plug shell
8 insulation
10 contact surface
11 contact surface
12 waveguide
13 layer construction
14 glass layer
15 glass layer
16 glass layer

What is claimed is:

1. A device for monitoring a combustion process in an internal combustion engine, comprising:

a component protruding into a combustion chamber an including a waveguide for an electromagnetic radiation, wherein:

the waveguide is formed by a peripheral-sided layering of different layers that are transparent in at least one of a visible wavelength range and an infrared wavelength range, and the waveguide is conductive in one of the visible range and the infrared range.

2. A device for monitoring a combustion process in an internal combustion engine, comprising:

a component protruding into a combustion chamber an including a waveguide for an electromagnetic radiation, wherein:

the waveguide is formed by a peripheral-sided layering of different layers that are transparent in at least one of a visible wavelength range and an infrared wavelength range; and a sensor for determining an intensity of an incoming radiation and arranged at an output of the waveguide.

3. A device for monitoring a combustion process in an internal combustion engine, comprising:

a component protruding into a combustion chamber an including a waveguide for an electromagnetic radiation, wherein:

the waveguide is formed by a peripheral-sided layering of different layers that are transparent in at least one of a visible wavelength range and an infrared wavelength range; and a sensor for analyzing a frequency of an incoming radiation and arranged at an output of the waveguide.

4. A device for monitoring a combustion process in an internal combustion engine, comprising:

a component protruding into a combustion chamber an including a waveguide for an electromagnetic radiation, wherein:

the waveguide is formed by a peripheral-sided layering of different layers that are transparent in at least one of a visible wavelength range and an infrared wavelength range, and the component includes one of a glow plug and a spark plug.

5. A device for monitoring a combustion process of an internal combustion engine, comprising:

a component protruding into a combustion chamber an including a waveguide for an electromagnetic radiation, wherein:

the waveguide is formed by a peripheral-sided layering of different layers that are transparent in at least one of a visible wavelength range and an infrared wavelength range, and the waveguide is embedded in a material of the component.

6. A device for monitoring a combustion process of an internal combustion engine, comprising:

a component protruding into a combustion chamber an including a waveguide for an electromagnetic radiation, wherein:

the waveguide is formed by a peripheral-sided layering of different layers that are transparent in at least one of a visible wavelength range and an infrared wavelength range; and a regulating unit for regulating an air-intake system based on a sensor signal recorded at an output of the waveguide.

7. A device for monitoring a combustion process in an internal combustion engine, comprising:

a component protruding into a combustion chamber an including a waveguide for an electromagnetic radiation, wherein:

the waveguide is formed by a peripheral-sided layering of different layers that are transparent in at least one of a visible wavelength range and an infrared wavelength range;

a sensor arranged at an output of the waveguide, the sensor configured to sense at least one measurable quantity of an incoming radiation; and a monitoring unit configured to monitor at least one dynamic of a combustion process in accordance with the at least one measurable quantity of the incoming radiation.

8. The device according to claim 7, wherein the at least one dynamic includes at least one of an ignition firing point, a duration of a fuel injection, a quantity of injected fuel, and a combustion temperature.

9. The device according to claim 7, wherein the at least one measurable quantity of the incoming radiation includes one of a frequency of the incoming radiation and an intensity of the incoming radiation.

10. The device according to claim 9, wherein the at least one measurable quantity of the incoming radiation includes the frequency of the incoming radiation, the at least one dynamic includes a combustion temperature, and the combustion temperature is monitored in accordance with the frequency of the incoming radiation.

* * * * *

UNITED STATES PATENT AND TRADEMARK OFFICE

CERTIFICATE OF CORRECTION

PATENT NO. : 6,668,630 B1 
DATED : December 30, 2003
INVENTOR(S) : Eckart Kuglin et al.

It is certified that error appears in the above-identified patent and that said Letters Patent is hereby corrected as shown below:

<u>Column 4,</u>
Line 37, change "8 insulation" to -- 9 insulation --

Signed and Sealed this

Third Day of May, 2005

JON W. DUDAS
*Director of the United States Patent and Trademark Office*